United States Patent
Ruan et al.

(10) Patent No.: US 7,079,768 B2
(45) Date of Patent: Jul. 18, 2006

(54) DYNAMIC PASSIVE OPTICAL NETWORK (PON) USING A DISTRIBUTED OPTICAL CROSS CONNECT AND DENSE WAVELENGTH DIVISION MULTIPLEXING

(75) Inventors: Alex Ruan, Alpharetta, GA (US); Christopher L. Rutledge, Somerset, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 604 days.

(21) Appl. No.: 09/820,513

(22) Filed: Mar. 29, 2001
(Under 37 CFR 1.47)

(65) Prior Publication Data
US 2002/0039214 A1    Apr. 4, 2002

Related U.S. Application Data

(60) Provisional application No. 60/235,892, filed on Oct. 3, 2000.

(51) Int. Cl.
*H04J 14/00* (2006.01)
(52) U.S. Cl. .............................. 398/58; 398/45; 398/49
(58) Field of Classification Search ................ 398/101, 398/49, 9, 72, 82, 45; 385/16, 24; 359/341.3
See application file for complete search history.

(56) References Cited

U.S. PATENT DOCUMENTS

| | | | |
|---|---|---|---|
| 5,136,411 A | 8/1992 | Paik et al. | 359/125 |
| 5,694,234 A | 12/1997 | Darcie et al. | 359/125 |
| 5,699,176 A | 12/1997 | Cohen | 359/118 |
| 5,742,414 A * | 4/1998 | Frigo et al. | 398/66 |
| 5,880,865 A | 3/1999 | Lu et al. | 359/125 |
| 5,959,767 A * | 9/1999 | Fatehi et al. | 359/341.3 |
| 5,963,350 A | 10/1999 | Hill | 359/127 |
| 6,192,172 B1 * | 2/2001 | Fatehi et al. | 385/17 |
| 6,396,573 B1 * | 5/2002 | Pimpinella | 356/73.1 |
| 6,590,681 B1 * | 7/2003 | Egnell et al. | 398/82 |
| 2001/0030785 A1 * | 10/2001 | Pangrac et al. | 359/125 |

* cited by examiner

Primary Examiner—David C. Payne

(57) ABSTRACT

A rapid and reconfigurable deployment of services in a CATV system is enabled by the use of dynamic passive optical networks (DPONs) in accordance with the present invention. By delivering a number of wavelengths to the PON and using various dynamically reconfigurable groupings of the wavelengths to support differing subsets of users, the maximum capabilities of a static PON architecture are greatly exceeded. In accordance with one embodiment of the invention, the dynamic PON device accepts M wavelengths on a single optical fiber. The output of the dynamic PON device includes N output ports. Each of the M signals can be delivered to none, some or all of the N output ports. At its input, the DPON includes an optical amplifier for amplifying the multi-wavelength input signal to a desired power level prior to splitting. A 1:N channel power splitter couples to the output of the optical amplifier. Each of the power splitter outputs contains all M wavelength channels of the optical fiber. Each of the N outputs of the power splitter is fed into an optical demultiplexer unit where each of the M optical signals appears on a (single) output fiber of the demultiplexer. The output ports of the M×M cross-connects are coupled to N optical multiplexers. More specifically, the output ports of the cross-connect are connected by grouping the output ports into M/N groups. The first of those groups is connected to the first optical multiplexer, the second of the groups to the second of the optical multiplexers and so on. In this manner, each cross-connect will have connectivity to all of the multiplexers via the M/N ports connected to each of the N optical multiplexers. In networks not employing DWDM, each of the M incoming wavelengths to the DPON would be split N times by a power splitter. The optical demultiplexers are not utilized. The outputs of all of the power splitters are then connected to the cross-connect fabric and the multiplexers as previously described.

21 Claims, 5 Drawing Sheets

BASIC PON ARCHITECTURE
(PRIOR ART)

DYNAMIC PON IMPLEMENTATION
(INITIAL)

DYNAMIC PON IMPLEMENTATION
(RECONFIGURATION)

DYNAMIC PASSIVE OPTICAL NETWORK (PON) USING A DISTRIBUTED OPTICAL CROSS CONNECT AND DENSE WAVELENGTH DIVISION MULTIPLEXING

CROSS-REFERENCE TO RELATED APPLICATIONS

This application claims priority of Provisional Application Ser. No. 60/235892 filed on Oct. 3, 2000.

FIELD OF THE INVENTION

The present invention relates generally to CATV systems and more particularly to CATV systems employing optical technology including Passive Optical Networks (PONs).

BACKGROUND OF THE INVENTION

The CATV business is evolving from merely broadcasting and supporting a number of channels to the targeting and supply of specific services geared to an individual user or user cluster during a given subscription period. In order to provide broadband type services, e.g., to enable Internet access services, service providers in the cable industry have expressed their desire to deliver a wavelength's worth of baseband digital information from a network's core to its edge using optical technology. It is highly impractical, however, to implement a system that could assign an individual wavelength to each of a large number of users being served by a secondary hub. That is, practicality dictates the use of a more passive type of system, e.g., a passive optical network (PON).

Many PONs utilize a tree topology where a passive optical splitter/merger provides broadcasting in the downstream direction and merging in the upstream direction. As thought of in a traditional sense, PONs are pure broadcast networks that are static in nature. That is, in order to change services to a customer or customer group, a physical change, for example, a change in the network configuration or equipment would need to take place. Even the so-called lamda-PONs which use filters to send certain wavelengths to different places in the network are still considered static. Such networks are not dynamically configurable, in that a service call is required in order to make an alteration to the network in order to change services.

Because of the static nature of PONs, a need exists to quickly and efficiently alter the configuration of a broadband optical network in order to provide a number of differing CATV services based on customer needs.

SUMMARY OF THE INVENTION

A rapid and reconfigurable deployment of services in a CATV system is enabled by the use of dynamic passive optical networks (DPONs) in accordance with the present invention. By delivering a number of wavelengths to the PON and using various dynamically reconfigurable groupings of the wavelengths to support differing subsets of users, the maximum capabilities of a static PON architecture are greatly exceeded. In accordance with one embodiment of the invention, the dynamic PON device accepts M wavelengths on a single optical fiber. The output of the dynamic PON device includes N output ports. Each of the M signals can be delivered to none, some or all of the N output ports. At its input, the DPON includes an optical amplifier for amplifying the multi-wavelength input signal to a desired power level prior to splitting. A 1:N channel power splitter couples to the output of the optical amplifier. Each of the power splitter outputs contains all M wavelength channels of the optical fiber.

Each of the N outputs of the power splitter is fed into an optical demultiplexer unit where each of the M optical signals appears on a (single) output fiber of the demultiplexer. The output ports of the M×M cross-connects are coupled to N optical multiplexers. More specifically, the output ports of the cross-connect are connected by grouping the output ports into M/N groups. The first of those groups is connected to the first optical multiplexer, the second of the groups to the second of the optical multiplexers and so on. In this manner, each cross-connect will have connectivity to all of the multiplexers via the M/N ports connected to each of the N optical multiplexers.

In networks not employing DWDM, each of the M incoming wavelengths to the DPON would be split N times by a power splitter. The optical demultiplexers are not utilized. The outputs of all of the power splitters are then connected to the cross-connect fabric and the multiplexers as previously described.

BRIEF DESCRIPTION OF THE DRAWINGS

A more complete understanding of the present invention may be obtained from consideration of the following detailed description of the invention in conjunction with the drawing, with like elements referenced with like references, in which.

DETAILED DESCRIPTION

Figure 1:
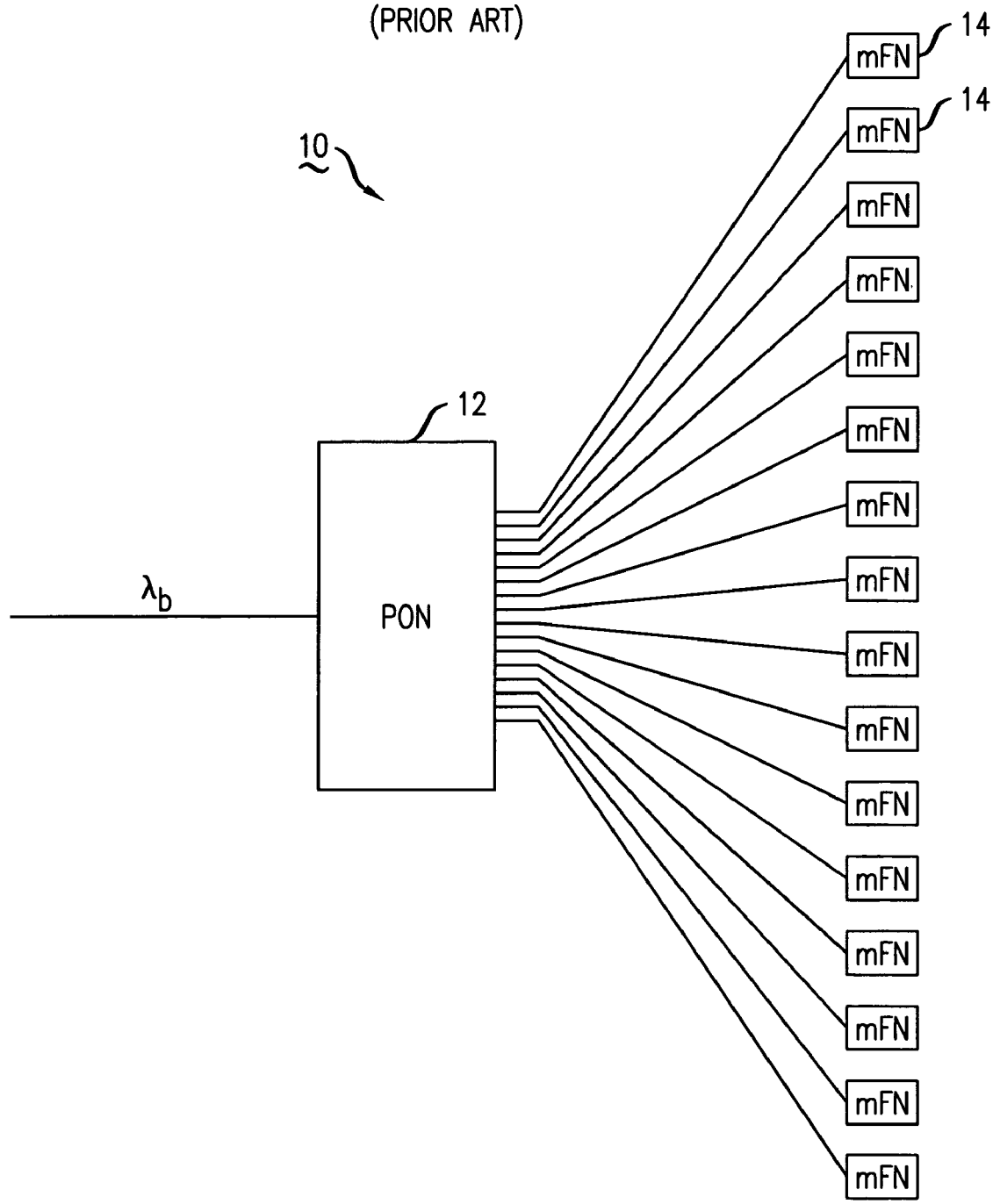
FIG. 1 is an exemplary embodiment of a passive optical network (PON) configured in a tree topology.

Passive Optical Networks (PONs) are used in the CATV and other environments to provide broadcast distribution from a source to multiple transmission destinations. Referring to FIG. 1, a basic PON architecture 10 is illustrated in which a single optical wavelength enters an optical splitter/merger 12 and is distributed to a number of miniature fiber nodes (mFNs) 14 within a cable system. The miniature fiber nodes (mFNs) 14 can function as a localized hub for a group of customers or may instead be representative of an interface for a single CATV customer. Such a structure is basically static in that the optical signal(s) which enter the PON splitter 12 are the only signals to be received downstream at the minifiber nodes 14. Multi-wavelength PONs which use filters to enable certain different wavelengths to be sent to different locations in the network also exist. These are still considered to be static and not dynamically configurable, however, in that a physical change to the PON must be made in order to alter the distribution makeup of the network.

Figure 2:
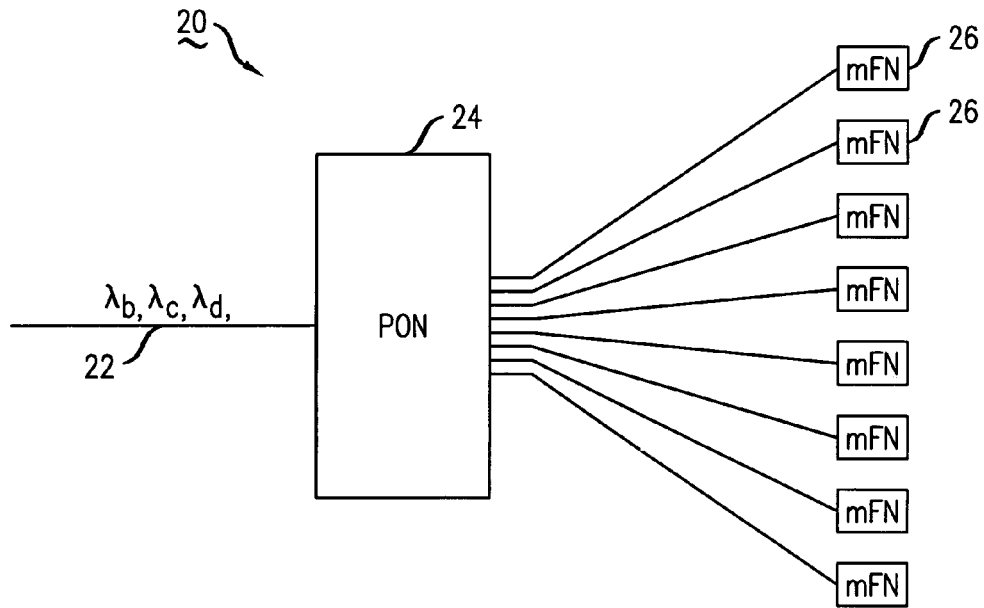
FIG. 2 is an exemplary block diagram of an architecture for a flexible or dynamic PON in accordance with the present invention.

Referring to FIG. 2., a high level block diagram of a flexible PON architecture 20 in accordance with the present invention is shown. As shown, an input fiber or fibers 22 to the PON carries a number of different wavelengths ($\lambda_b$, $\lambda_c$, $\lambda_d$). These wavelengths are input, for example, to an optical cross-connect device 24. The optical cross-connect distributes the input signal among the miniature fiber nodes 26 according to wavelengths. As would be understood, the various wavelengths are representative of different customer services or different customer services packages, which may include, for example, CATV, cable modem, telephony, etc. By segmenting the output of the PON according to the various wavelengths, higher performance per micro fiber node is achieved as the amount of sharing among minifiber nodes is decreased.

Figure 3:
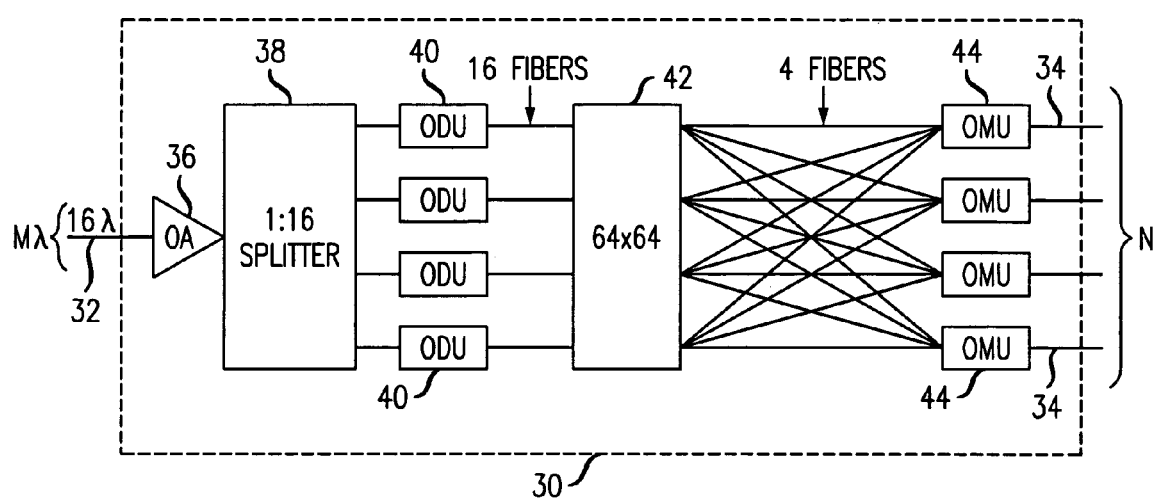
FIG. 3 is an exemplary block diagram of a dynamic PON device in accordance with the present invention.

Referring to FIG. 3, a more detailed embodiment of the present invention is illustrated. The basic dynamic PON architecture 30 is shown within the context of an optical WDM system. As shown, the dynamic PON device 30 accepts M wavelengths, where M equals 16 in this case, on a single optical fiber 32. The output of the dynamic PON device 20 includes N (in this case four (4)) output ports 34. In accordance with the present invention, each of the M signals can be delivered to none, some or all of the N output ports 34. At its input 32, the DPON includes an optical amplifier 36 for amplifying the multi-wavelength input signal to a desired power level prior to splitting. A 1:N channel power splitter 38 couples to the output of the optical amplifier 36. Each of the power splitter outputs contains all M wavelength channels of the optical fiber.

Each of the N outputs of the power splitter 38 is fed into an optical demultiplexer 40 unit where each of the M optical signals appears on a (single) output fiber of the demultiplexer 40. All outputs of the demultiplexer 40 are terminated on what is at least an M×M cross-connect 42. As is known, a cross-connect functions to connect any one input to any one or more output ports. In one exemplary embodiment of the present invention, an optical cross-connect employing MEMs technology is utilized. Other types of cross-connects employing all optical and optical/electrical technology, for example, Digital Access and Cross-connect Systems (DACS) could also be utilized. The various cross-connect technologies and functionalities are known by persons skilled in the art and need not be discussed in greater detail.

The output ports of the M×M cross-connects 42 are coupled to N optical multiplexers 44. More specifically, the output ports of the cross-connect are connected by grouping the output ports into M/N groups. The first of those groups is connected to the first optical multiplexer, the second of the groups to the second of the optical multiplexers and so on. In this manner, each cross-connect 42 will have connectivity to all of the multiplexers 44 via the M/N ports connected to each of the N optical multiplexers. In order to support the above-described architecture, N M×M cross-connects are utilized. This architecture lends itself to a modular design, which is advantageous in that in the initial phases of deployment of a network including dynamic DPONs, there may be a limited number of wavelengths and a limited deployment depth. It would also be understood, however, that the N M×M cross-connects can be replaced by an (N)M×(N)M cross-connect with standard connections to the optical multiplexers.

In networks not employing DWDM, each of the M incoming wavelengths to the DPON would be split N times by a power splitter. The optical demultiplexers are not utilized. The outputs of all of the power splitters are then connected to the cross-connect fabric and the multiplexers as was previously described.

Figure 4:
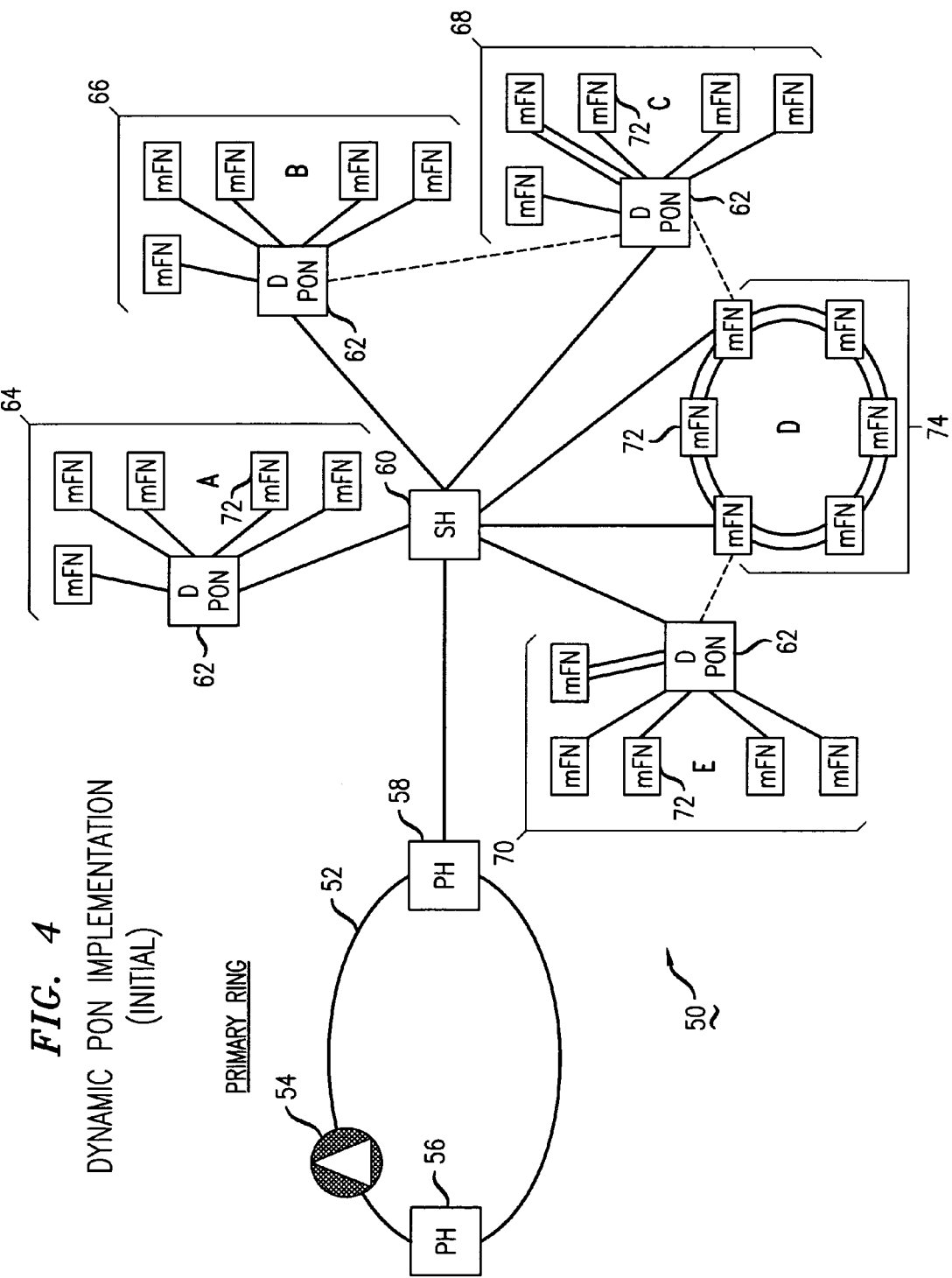
FIG. 4 illustrates the usage of dynamic PON devices within the context of an exemplary CATV network.

Referring to FIG. 4, an exemplary implementation of the present invention DPON is shown within the context of a CATV network 50. The network 50 as shown includes a primary ring 52 having a master head end 54 and a first primary hub 56 and a second primary hub 58. The master head end 54 transmits and receives all of the communication signals in the network. The primary hubs 56, 58 link to other portions of the network and distribute those communication signals that they are programmed to pass along. As shown, the second primary hub 58 links to a secondary hub 60 which further distributes all of the programmed available communications signals downstream. The secondary hub 60 couples to a number of sub-networks, some of which include DPONs 62. A first 64, second 66, third 68 and fifth 70 sub-network are configured in a tree topology, where the miniature fiber nodes (mFNs) 72 on each sub-network couple to the secondary hub 60 through respective DPONs 62. A fourth sub-network 74 is configured in a ring topology, where certain miniature fiber nodes on the sub-network couple directly to the secondary hub 60. FIG. 4 represents and initial configuration of the CATV network 50 where each of the sub-networks receives a wavelength or wavelengths representative of a different set of targeted services. For instance, the first sub-network 64 receives wavelengths which are representative of service package A, the second sub-network 66 receives services which are representative of service package B and so on.

Figure 5:
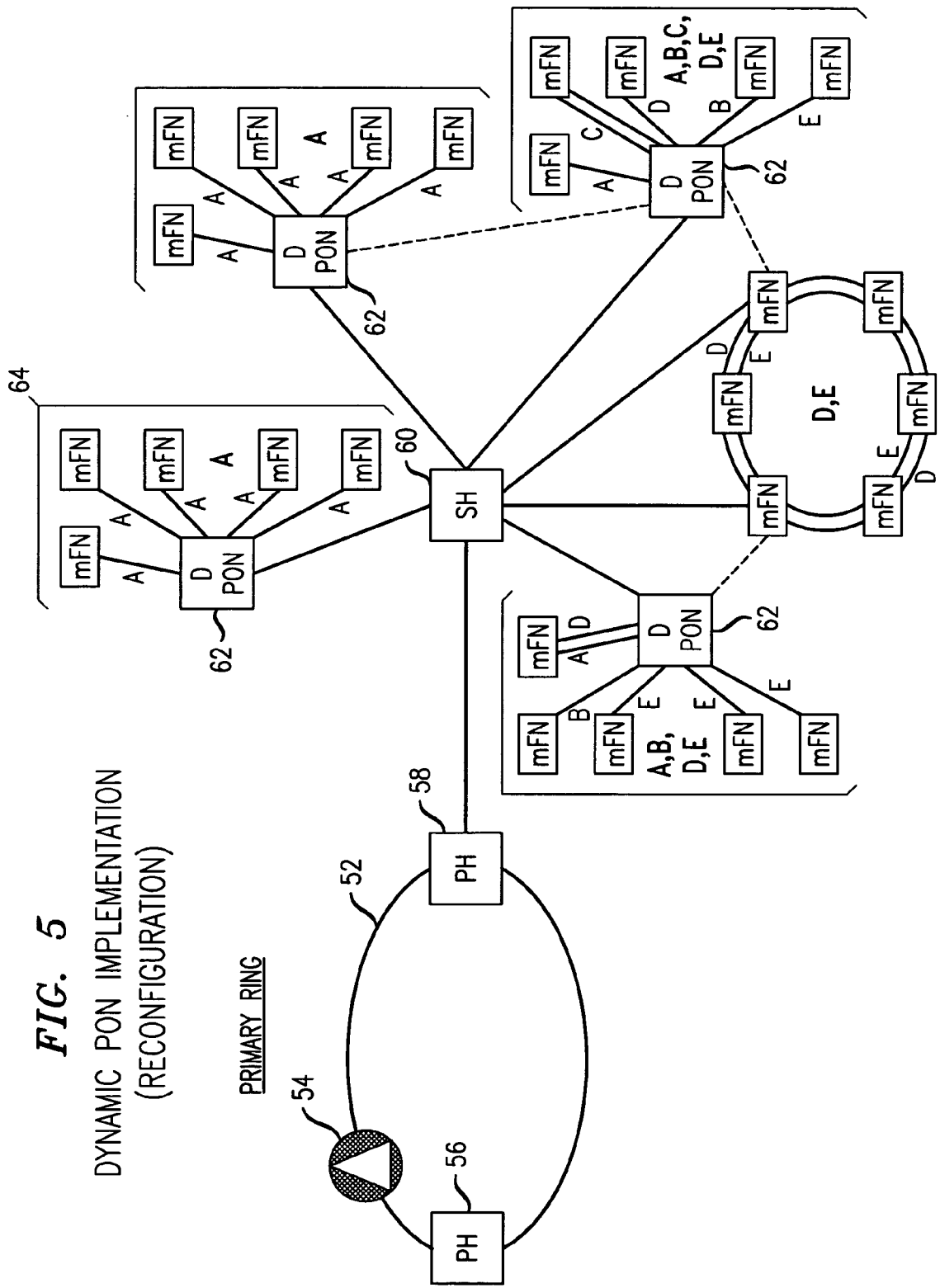
FIG. 5 shows the network of FIG. 4 after a dynamic reconfiguration of subscriber services on the network has taken place.

Referring to FIG. 5, a second representation of the exemplary CATV network 58 is shown after a dynamic reconfiguration of the network has taken place. FIG. 5 illustrates that after the reconfiguration, different wavelengths representing different sets of services can now be routed to the sub-networks by way of an alteration of the cross-connects in the DPONs 62. As shown, the first sub-network 64 continues to receive service set A, whereas the second sub-network 66 has been modified to also receive service set A. Upon reconfiguration, the third sub-network has been modified such that each of service sets A, B, C, D, E is distributed to one of the miniature fiber nodes in the sub-network. Each mFN on the fourth sub-network 74 (ring network) now also receives wavelengths corresponding to service sets D and E. As shown, the DPON in the fifth sub-network 70 has also been reconfigured to provide one or more of service sets A, B, D, and E to the targeted mFN therein. As can be seen, the fourth sub-network 74 couples directly to the secondary hub and is provided redundancy protection by way of the adjacent DPONs. Accordingly, in order to accomplish the illustrated level of scalability/reconfigurability, a level of "intelligence" or selectivity is necessary at least up to the secondary hub 60, so that wavelengths corresponding to the targeted service sets can be distributed to the targeted sub-networks. Further scaling/reconfiguration functionality can be accomplished by moving the intelligence or selectivity upstream, for example to the primary hub 56, 58, so that reconfiguration can now be achieved across several secondary hubs and so on. The present invention is advantageous in that it can enable dynamic allocation of bandwidth depending, for example, on the time of the day or day of the week. During traditional hours of a business day, 8 am–5 pm, for example, a majority of a specific network's capacity (wavelengths) can be allocated towards portions of the network serving business customers. In contrast, during non-business hours, e.g., 5 pm–8 am, a majority of the network bandwidth can be allocated toward households. This is a significant value proposition for the present invention in that it enables the effective sharing of resources between differing customer markets.

As mentioned previously, it is conceivable that MEMs based optical cross-connects may be utilized as the cross-connect fabric within the DPONs. This is because the initial port-count requirements for the MEMs based cross-connects would be much lower than what is needed for standard telecommunication-type applications. An estimation is that a port requirement of less than a 100×100 would be sufficient for many cable applications. For example, a secondary hub serving 20,000 homes and fed by and 80 wavelength OLS system would require an 80×16 optical cross-connect at the hub and an 80×24 optical cross-connect at the Mux Node. Due to the nature of the cross-connects, a customer's optical path could have the capabilities of a dedicated fiber as the optical cross-connect is managing optical paths and not optical wavelengths. The head end box will still be needed as a bridge between the analog world and the OLS transport equipment.

Figure 6:
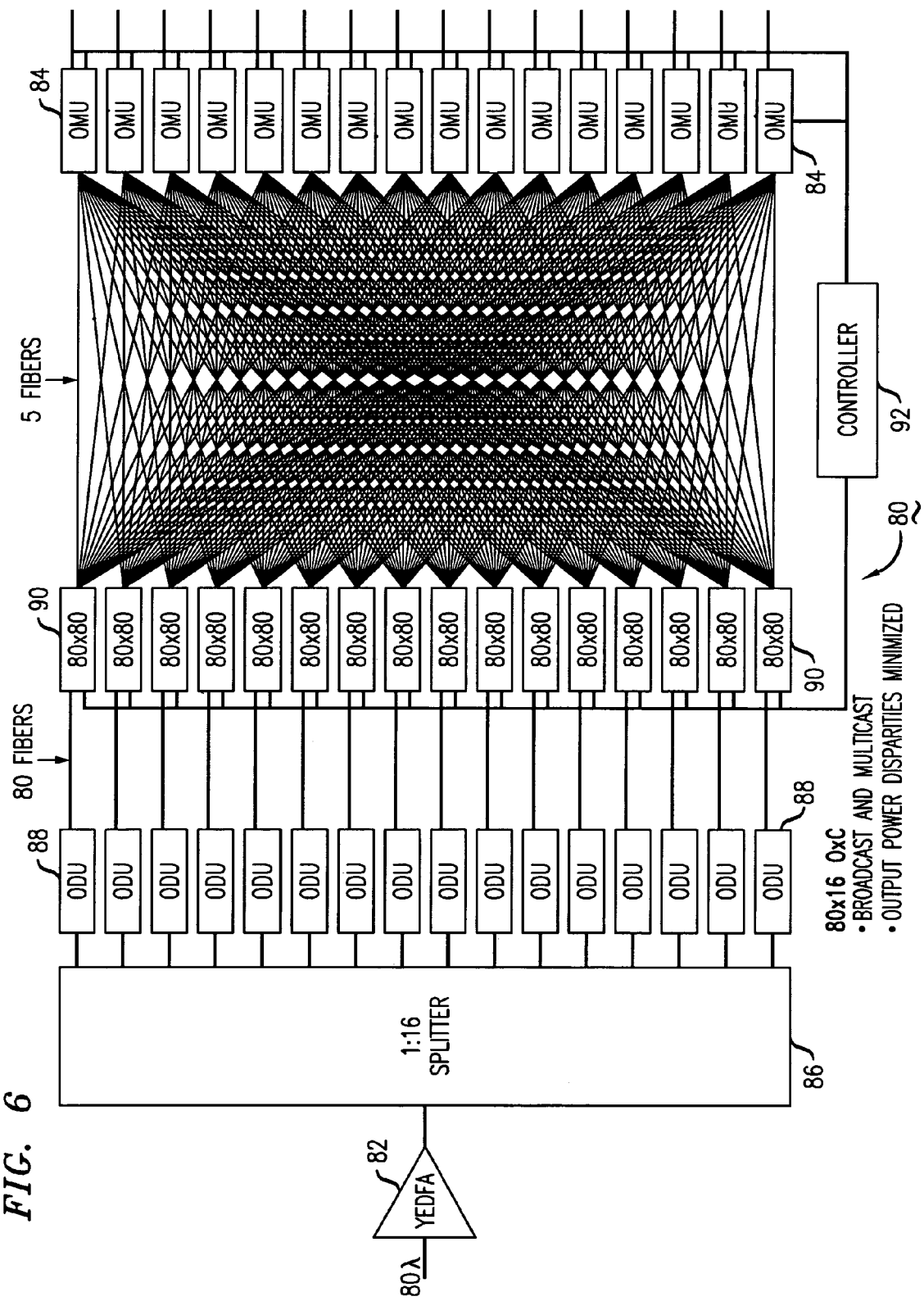
FIG. 6 shows a larger scale embodiment of a DPON apparatus in accordance with the present invention.

Referring to FIG. 6, an exemplary embodiment of larger scale DPON 80 in accordance with the present invention is shown. The DPON of FIG. 6 employs WDM and receives 80 wavelengths at the input of an optical amplifier 82 and has 16 different outputs extending from different optical multiplexer units 84. The output of the optical amplifier 82 couples to a 1:16 power splitter 86 where the output of the power splitter 86 couples to 16 individual demultiplexer units 88. The demultiplexer units 88 in turn couple to respective 80×80 optical cross-connects 90. The outputs of the individual cross-connects 90 which are divided into M/N groupings are coupled to individual ones of the optical multiplexer units 84 in a similar fashion to the embodiment described with respect to FIG. 3. It should be noted that for the sake of clarity, each of the individual lines connecting between an optical demultiplexer unit 88 and a 80×80 cross-connect 90 represents 80 individual fibers and that each of the individual lines between a cross-connect and a an optical multiplexer unit represents five (5) individual fibers.

In order to make the present invention attractive from a revenue standpoint for the service providers, session management software is included in a controller 92 will be utilized in order to control and track when and to where different services are provided on the network. The controller 92 will also determine how to utilize the dark wavelengths when they are idle, for example as part of the signaling mechanism. It is more likely, however, that a separate wavelength path will always be utilized for signaling purposes. The controller 92 will also be responsible for managing the configuration and reconfiguration of a single or pieced cross-connect fabric. The software in the controller 92 is intended to manage the configuration of concatenated fabrics (e.g., from the master headend to the mFNs). The controller, in effect, "remembers" the configuration of each individual cross-connect and the cross-connect fabric as a whole. This allows for proper provisioning and maintenance of the network. As subscribers move on and off of the PON that the fabric establishes, the software in the controller tracks this activity which can then be utilized for billing purposes. As each cross-connect passes configuration information to the lower level fabrics, the upstream (reverse) path will also be set accordingly.

An advantage of the present invention is that multiple wavelengths are able to be provided downstream on a targeted basis. To make full use of such a system, it is beneficial to also support multi-wavelength upstream traffic. One exemplary methodology to provide upstream traffic support is with a similar (or shared) fabric as in the downstream direction.

The present invention is also advantageous in that it contemplates the situation in which local channel insertion is necessary. In order to provide local channel insertion, another cross-connect can be inserted into the existing cross-connect fabric such that the additional cross-connect connects with the optical multiplexers along with the rest of the "through" traffic. The local wavelengths could also be the same as the through traffic wavelengths. In this case, however, software in the controller will prevent the connection of those identical wavelengths of the through traffic (carrying different signals) to the same port.

The foregoing description merely illustrates the principles of the invention. It will thus be appreciated that those skilled in the art will be able to devise various arrangements, which, although not explicitly described or shown herein, embody the principles of the invention, and are included within its spirit and scope. Furthermore, all examples and conditional language recited are principally intended expressly to be only for instructive purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Many other modifications and applications of the principles of the invention will be apparent to those skilled in the art and are contemplated by the teachings herein. Accordingly, the scope of the invention is limited only by the claims.

What is claimed is:

1. An apparatus for use in an optical network for providing specified communications signals to targeted recipients, said apparatus comprising:

a power splitter for splitting an incoming optical signal into a given number of outputs:

one or more cross-connect devices coupled to said power splitter for receiving communication signals on individual communication paths; and one or more optical multiplexer units having inputs respectively coupled to selected outputs of said cross-connect devices, wherein said cross-connect devices and said optical multiplexer units are controllably operable to dynamically and selectively distribute said communication signals on said individual communications paths to none, some or all inputs of said optical multiplexer units for distribution to said targeted recipients.

2. The apparatus of claim 1, wherein said apparatus is placed within a passive optical network.

3. The apparatus of claim 1, wherein said optical network is a CATV network.

4. The apparatus of claim 1, wherein said network is dynamically reconfigurable depending on changing customer needs.

5. The apparatus of claim 1, further including a controller coupled to cross-connect devices and said optical multiplexers, said controller being operable to track connections and signal distribution of said cross-connect devices and said optical multiplexer units to thereby determine usage of said specified communications signal by said targeted recipients.

6. The apparatus of claim 1, wherein said cross-connects include M inputs and said optical multiplexers include N outputs, said connections between said cross-connect devices and said optical multiplexer units being divided into M/N groups.

7. The apparatus of claim 1, wherein multiple ones of said apparatus are hierarchically distributed within said network.

8. The apparatus of claim 1, wherein said cross-connect devices are MEMs devices.

9. The apparatus of claim 1, wherein an additional one of said apparatus is utilized to direct upstream communications in said network.

10. In a CATV distribution network, at least a portion of which includes optical distribution capabilities, an apparatus for dynamically providing selective distribution of specified signals to miniature fiber nodes in said network, said apparatus comprising:
   a power splitter for splitting an incoming optical signal into a given number of outputs.
   one or more cross-connect devices coupled to said power splitter for receiving said specified communication signals on individual communication paths; and
   one or more optical multiplexer units having inputs respectively coupled to selected outputs of said cross-connect devices,
   wherein said cross-connect devices and said optical multiplexer units are controllably operable to dynamically and selectively distribute said communication signals to inputs of said optical multiplexer units for targeted distribution to said miniature fiber nodes.

11. The apparatus of claim 10, wherein said specified communication signals are contained on various optical wavelengths, one or more selected wavelengths being representative of a target service for said target recipients.

12. The apparatus of claim 10, wherein said network is dynamically reconfigurable depending on changing customer needs.

13. The apparatus of claim 10, further including a controller coupled to cross-connect devices and said optical multiplexers, said controller being operable to track connections and signal distribution of said cross-connect devices and said optical multiplexer units to thereby determine usage of said specified communications signal by targeted recipients coupled to said miniature fiber node.

14. The apparatus of claim 10, wherein said cross-connects include M inputs and said optical multiplexers include N outputs, said connections between said cross-connect devices and said optical multiplexer units being divided into M/N groups.

15. The apparatus of claim 10, wherein multiple ones of said apparatus are hierarchically distributed within said network.

16. In a CATV distribution network, at least a portion of which includes optical distribution capabilities, a method for providing selective distribution of specified signals to miniature fiber nodes in said network, said method comprising the steps of:
   splitting an incoming optical signal into a given number of outputs, said outputs including said specified signals;
   receiving said specified signals on individual communication paths at on or more cross-connect devices;
   respectively coupling inputs of one or more optical multiplexer units to selected outputs of said cross-connect devices,
   dynamically controlling said cross-connect devices and said optical multiplexer units to selectively distribute said communication signals to inputs of said optical multiplexing units for targeted distribution to said miniature fiber nodes.

17. The method of claim 16, wherein said specified communication signals are contained on various optical wavelengths, one or more selected wavelengths being representative of a target service for said target recipients.

18. The method of claim 16, wherin a controller couples to cross-connect devices and said optical multiplexers, said controller being operable to track connections and signal distribution of said cross-connect devices and said optical multiplexer units to thereby determine usage of said specified communications signal by targeted recipients coupled to said miniature fiber node.

19. The apparatus of claim 1,-wherein said optical network is a WDM network, further including one or more optical demultiplexing units respectively coupled between said power splitter and said cross-connect devices.

20. The apparatus of claim 10, wherein said optical network is a WDM network, further including one or more optical demultiplexing units respectively coupled between said power splitter and said cross-connect devices.

21. The method of claim 16, wherein said optical network is a WDM network, further including the step of demultiplexing the power split signals prior to being input to said cross-connect devices.

* * * * *